United States Patent
Chang

(10) Patent No.: US 9,260,119 B2
(45) Date of Patent: Feb. 16, 2016

(54) FULL BUTT JOINT STRUCTURE OF CONNECTION JOINT BETWEEN SIDE FRAME AND CROSS BEAM OF BOGIE FRAME AND ASSEMBLY WELDING PROCESS

(71) Applicant: Changchun Railway Vehicles Co., Ltd., Changchun (CN)

(72) Inventor: Li Chang, Changchun (CN)

(73) Assignee: CHANGCHUN RAILWAY VEHICLES CO., LTD., Jilin (CN)

(*) Notice: Subject to any disclaimer, the term of this patent is extended or adjusted under 35 U.S.C. 154(b) by 285 days.

(21) Appl. No.: 13/852,905

(22) Filed: Mar. 28, 2013

(65) Prior Publication Data

US 2013/0213258 A1    Aug. 22, 2013

Related U.S. Application Data

(63) Continuation of application No. PCT/CN2011/075251, filed on Jun. 3, 2011.

(30) Foreign Application Priority Data

Sep. 28, 2010  (CN) .......................... 2010 1 0293968

(51) Int. Cl.
- *B61F 5/00* (2006.01)
- *B61F 5/52* (2006.01)
- *B23K 31/00* (2006.01)
- *B23K 9/00* (2006.01)

(52) U.S. Cl.
CPC ... *B61F 5/52* (2013.01); *B23K 9/00* (2013.01); *B23K 31/003* (2013.01)

(58) Field of Classification Search
USPC .......................... 105/182.1, 202, 206.1, 206.2
See application file for complete search history.

(56) References Cited

U.S. PATENT DOCUMENTS 3,915,095 A * 10/1975 Briggs ........................... 105/202
4,133,268 A *  1/1979 Guillaumin ................... 105/202
(Continued)

FOREIGN PATENT DOCUMENTS

CN          201189870 Y      2/2009
CN          101973282 A      2/2011
(Continued)

OTHER PUBLICATIONS

International Search Report of International Application No. PCT/CN2011/075251, dated Sep. 15, 2011.

*Primary Examiner* — R. J. McCarry, Jr.
(74) *Attorney, Agent, or Firm* — J.C. Patents

(57) ABSTRACT

A full butt joint structure of a connection joint between a side frame and a cross beam of a bogie frame, characterized in: the side frame is connected to the cross beam by a connecting seat to realize the full butt joint, a side frame connecting end of the connecting seat, a transport column and a side frame inside vertical plate form a plate-plate butt joint structure, and a cross beam connecting end of the connecting seat and the cross beam form a tube-tube butt joint structure. An assembly welding process comprises: the connecting seat is assembled and welded to the cross beam; a cross beam unit is assembled and welded; the connecting seat is assembled and welded to the transport column and the side frame inside vertical plate; a side frame strengthen partition plate is assembled and welded to an upper plate; and the bogie frame is welded.

5 Claims, 3 Drawing Sheets

(56) References Cited

U.S. PATENT DOCUMENTS 4,338,865 A * 7/1982 Eggert, Jr. .................... 105/202
5,832,838 A * 11/1998 Shaw ......................... 105/206.2

FOREIGN PATENT DOCUMENTS

| CN | 201816609 U | 5/2011 |
| FR | 2 632 918 A1 | 12/1989 |

* cited by examiner

FULL BUTT JOINT STRUCTURE OF CONNECTION JOINT BETWEEN SIDE FRAME AND CROSS BEAM OF BOGIE FRAME AND ASSEMBLY WELDING PROCESS

CROSS-REFERENCE TO RELATED APPLICATIONS

This application is a continuation of International Application No. PCT/CN2011/075251, filed on Jun. 3, 2011, which claims priority to Chinese Patent Application No. 201010293968.X, filed on Sep. 28, 2010, both of which are hereby incorporated by reference in their entireties.

FIELD OF THE TECHNOLOGY

The present invention relates to a full butt joint structure of a connection joint between a side frame and a cross beam of a bogie frame and an assembly welding process thereof.

BACKGROUND

A connection joint between a side frame and a cross beam of a bogie frame in the prior art can't realize a full butt joint structure due to limitations of design ideas and restrictions of an assembly welding process. An interface between the side frame and the cross beam is mostly designed as a corner joint structure or a composite structure of a corner joint structure and a butt joint structure, and few is designed as an lap joint structure. Thus, the stress concentration factor of the connection joint between the side frame and the cross beam, in particular in a weld seam, is larger, which reduces the fatigue life of the bogie frame, and influences the carrying capacity and speed of the bogie.

SUMMARY

A technical problem to be solved by the present invention is to provide a full butt joint structure of a connection joint between a side frame and a cross beam of a bogie frame and an assembly welding process thereof, which has the minimum stress concentration in a weld seam, so as to prolong the fatigue life of the bogie frame and make the running of the bogie more secure and reliable.

To solve the technical problem above, an aspect of the present invention provides a full butt joint structure of a connection joint between a side frame and a cross beam of a bogie frame, characterized in: the side frame is connected to the cross beam by a connecting seat to realize the full butt joint, wherein a side frame connecting end of the connecting seat, a transport column and a side frame inside vertical plate form a plate-plate butt joint structure, and a cross beam connecting end of the connecting seat and the cross beam form a tube-tube butt joint structure.

Another aspect of the present invention provides an assembly welding process for a full butt joint structure of a connection joint between a side frame and a cross beam of a bogie frame, characterized in: the side frame is connected to the cross beam by a connecting seat to realize the full butt joint, a side frame connecting end of the connecting seat, a transport column and a side frame inside vertical plate form a plate-plate butt joint structure, and a cross beam connecting end of the connecting seat and the cross beam form a tube-tube butt joint structure, and the assembly welding process comprises: the connecting seat is assembled and welded to the cross beam; a cross beam unit is assembled and welded; the connecting seat is assembled and welded to the transport column and the side frame inside vertical plate; a side frame strengthen partition plate is assembled and welded to an upper plate; and the bogie frame is welded as a whole.

The welding for the connecting seat and the cross beam adopts a MAG automatic welding process, and the remaining welding adopts a MAG semi-automatic welding process.

A back gouging is performed when a double sides welding is adopted in the welding of the connecting seat and the cross beam, and a removable backing strip is adopted in the butt welding of the side frame connecting end of the connecting seat, the transport column and the side frame inside vertical plate.

The new connection joint between the side frame and the cross beam of the present invention realizes a full butt joint between side frame and cross beam of the bogie frame, at the same time, the connecting seat is employed so that the welding seam is avoided locating in the cross sections of higher stress concentration and regions having larger changes in the shape, and it is the most optimal joint structure in the theory of welding structure, that is, the stress concentration is minimum in the welding point, and the welding filler, the welding residual stress and deforming can reach the minimum. The appearance of the structure is continuous and esthetically pleasing. The carrying capacity and anti-fatigue ability become greater. The process of the present invention breaks through the traditional process that the bogie frame is constructed after the side frame and the cross beam both become the finished products respectively, and its advantages are far beyond the existing structures such as a corner joint structure or a composite structure of a corner joint structure and a butt joint structure, and more significantly superior to an lap joint structure.

DETAILED DESCRIPTION OF THE EMBODIMENT

Figure 1:
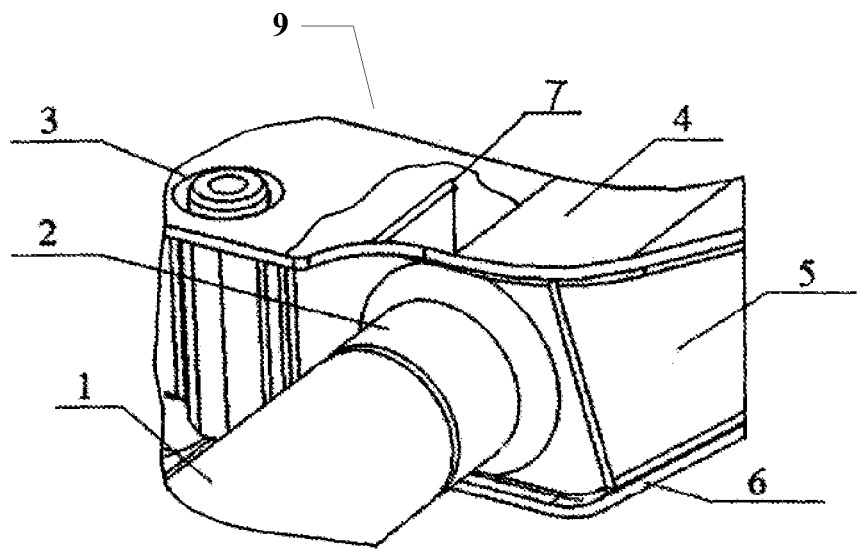
FIG. 1 is a schematic diagram of a full butt joint structure of a connection joint between a side frame and a cross beam according to an embodiment of the present invention.

FIG. 1 is a schematic diagram of a full butt joint structure of a connection joint between a side frame and a cross beam according to an embodiment of the present invention. Referring to FIG. 1, a side frame 9 is connected to a cross beam 1 by a connecting seat 2 to realize a full butt joint, that is, a side frame connecting end of the connecting seat 2, a transport column 3 and a side frame inside vertical plate 5 form a plate-plate butt joint structure, and a cross beam connecting end of the connecting seat 2 and the cross beam 1 form a tube-tube butt joint structure.

Figure 2:
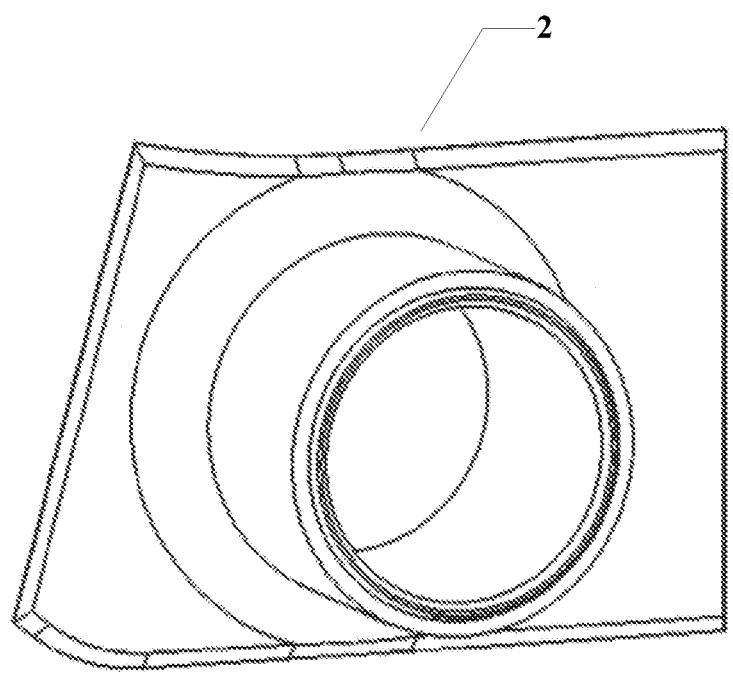
FIG. 2 is a schematic diagram of a connecting seat according to an embodiment of the present invention.
Figure 3:
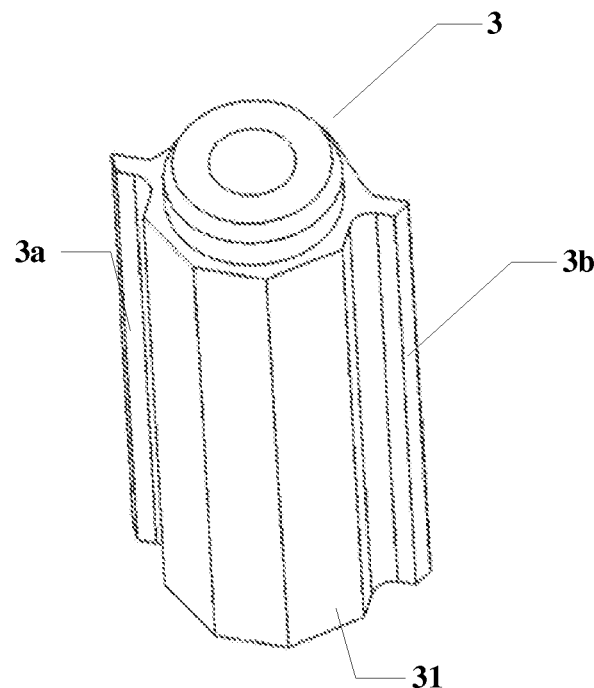
FIG. 3 is a schematic diagram of a transport column according to an embodiment of the present invention.
Figure 4:
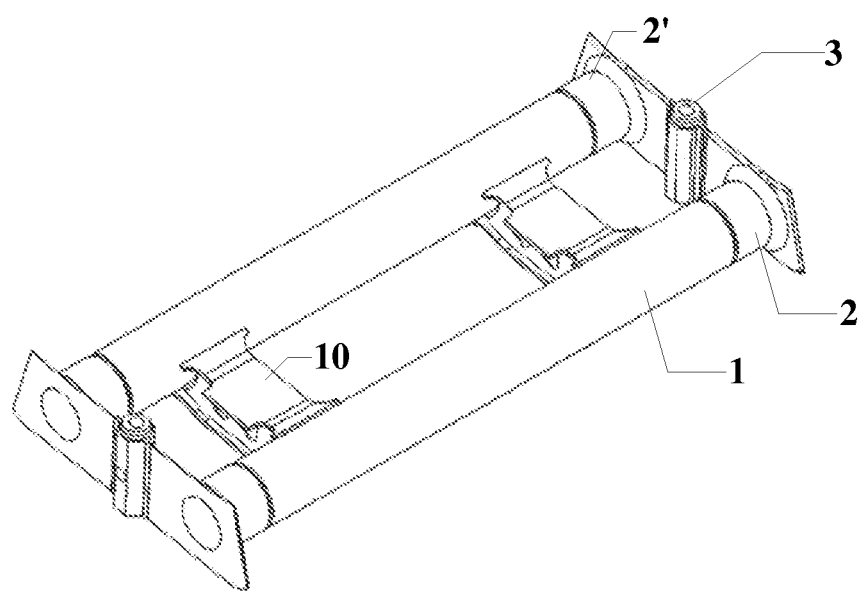
FIG. 4 is a schematic diagram of an assembly welding for a cross beam unit and the transport column according to an embodiment of the present invention.
Figure 5:
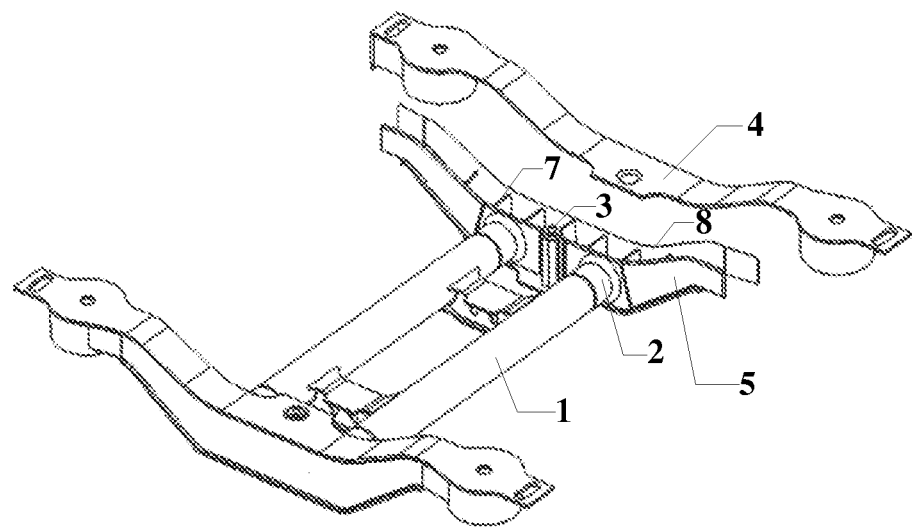
FIG. 5 is a schematic diagram of an assembly for the cross beam unit and the side beam according to an embodiment of the present invention.

FIG. 2 is a schematic diagram of a connecting seat according to an embodiment of the present invention; FIG. 3 is a schematic diagram of a transport column according to an embodiment of the present invention; FIG. 4 is a schematic diagram of an assembly welding for a cross beam unit and the transport column according to an embodiment of the present invention; and FIG. 5 is a schematic diagram of an assembly for the cross beam unit and the side beam according to an embodiment of the present invention. According to the embodiment of the present invention, two ends of the cross beam 1 (for example, a cross beam tube) are respectively assembled and welded to two connecting seats 2. The cross beam unit as indicated in FIG. 4 is formed by welding two ends of each of two cross beams 1 respectively to two connecting seats 2. The cross beam unit further comprises two connecting components 10, and two ends of each of the two connecting components 10 are respectively connected to the two cross beams 1. The cross beam unit as indicated in FIG. 4 comprises two connecting components 10 which are separated from each other. The number of the connecting component 10 can be one or more than two. Then, the connecting seat 2 is assembled and welded to the transport column 3. As shown in FIG. 2, the connecting seat 2 comprises extending plates which respectively extend to two sides. As shown in FIG. 3, the transport column 3 comprises a cylinder 31 and tabular bodies 3a and 3b which respectively extend to two sides from the cylinder 31. As indicated in FIG. 4, one extending plate of the connecting seat 2 on one side is assembled and welded to one tabular body of the transport column 3, and one extending plate of another connecting seat 2' is assembled and welded to the other tabular body of the transport column 3, such that the connecting seat 2 and the connecting seat 2' are connected via the transport column 3. The transport column 3 can maintain a shape and size of the cross beam unit. Next, as shown in FIG. 5, the connecting seat 2 is assembled and welded to the side frame inside vertical plate 5, wherein the other extending plate of the connecting seat 2 on the other side is assembled and welded to the side frame inside vertical plate 5. Optionally, the thickness of the extending plates of the connecting seat 2 is the same as the thickness of the tabular bodies of the transport column 3 and the thickness of the side frame inside vertical plate 5, such that a butt joint with a uniform thickness and a full penetration welding thereof can be ensured. The extending plates of the connecting seat 2, the tabular bodies of the transport column 3 and the side frame inside vertical plate 5 can be any appropriate shape, providing that they can match with one another to form the full penetration welding, for instance, they are shown in the figures as flat ones.

Thereafter, an assembly welding for a side frame strengthen partition plate and an upper plate is performed. According to the embodiment of the present invention, the side frame 9 comprises an upper plate 4, a bottom plate 6, the side frame inside vertical plate 5, a side frame strengthen partition plate 7 and a side frame outside vertical plate 8. After the cross beam unit is assembled and welded to the transport column 3 and the side frame inside vertical plate 5, the side frame strengthen partition plate 7 and the upper plate 4 are assembled and welded to form the side beam 9. Specifically, the side frame strengthen partition plate 7 is welded to the connecting seat 2, the bottom plate 6 and the side frame outside vertical plate 8, and the welding of these components can increase the joint strength between the side beam 9 and the cross beam unit. The upper plate 4 is welded to the transport column 3, the connecting seat 2, the side frame inside vertical plate 5 and the side frame outside vertical plate 8. Then, other components can be further welded as required to complete the assembly welding for the whole bogie frame.

According to the embodiment of the present invention, one cross beam unit and two side beams 9 constitute one bogie frame.

Figure 6:
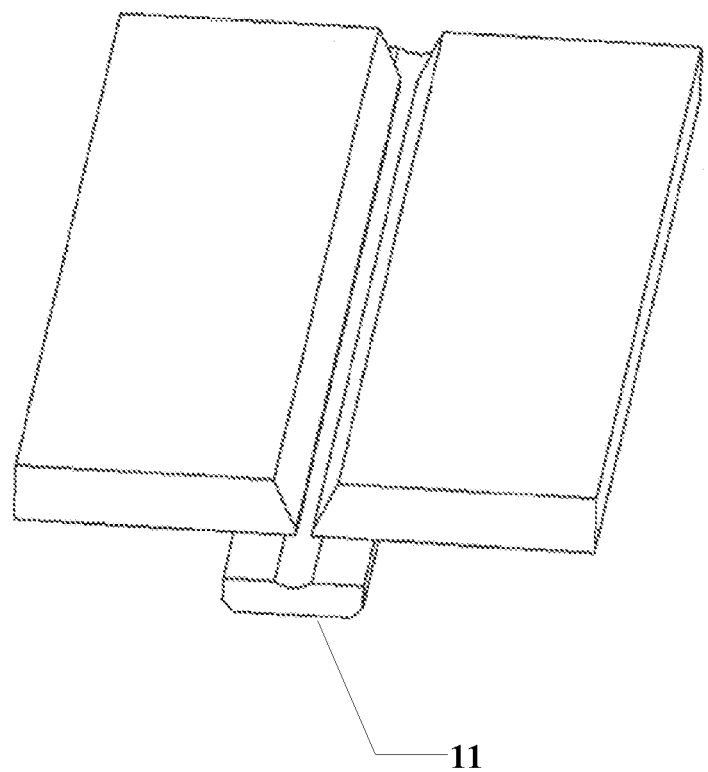
FIG. 6 is a schematic diagram of the use of a backing strip according to an embodiment of the present invention.

In the assembly welding process for the full butt joint structure between the side frame and the cross beam of a bogie frame according to the embodiment of the present invention, the side frame 9 and the cross beam unit are combined to complete an overall assembly for the bogie frame when the side frame 9 is a semi-finished product (i.e., a side beam trough without the upper plate 4), which is a new assembly welding process of the bogie frame. The process of the present invention breaks through the traditional process that the bogie frame is constructed after the side beam 9 and the cross beam unit both become the finished products respectively, and it enables the automatic MAG (Metal Active Gas) welding of the cross beam 1 and the connecting seat 2 to be achieved; can achieve the smooth assembly welding of the side frame strengthen partition plate 7; and can ensure a precise assembly and high quality welding of the cross beam unit and the side frame inside vertical plate 5. The welding for the connecting seat 2 and the cross beam 1 adopts the well-developed MAG automatic welding process and a RT (Radiographic Testing) is conducted on a welding seam. The welding for the connecting seat 2, the transport column 3 and the side frame inside vertical plate 5can adopt the MAG semi-automatic welding process having a removable backing strip, and a UT (Ultrasonic Testing) is conducted on the welding seam, which ensures a reliable quality of the welding seam. FIG. 6 is a schematic diagram of using a backing strip 11 when welding the connecting seat 2, the transport column 3 and the side frame inside vertical plate 5. Optionally, the backing strip 11 can be a ceramic backing strip, which is disposed at one side of the weld seam far away from a welding gun, for the welding of the connecting seat 2, the transport column 3 and the side frame inside vertical plate 5. After the welding, the backing strip can be removed. The adoption of such a ceramic backing strip is good for adjusting a gap of the connection joint, ensuring the welding quality, reducing the operation difficulty, and further contributing to improve the welding efficiency.

Besides, the connecting seat 2 and the cross beam 1 adopts a gapless assembly before the welding, and in the case of the welding procedure specifications are consistent, the welding shrinkage allowance is made to be precise and uniform, which allows the length error of the cross beam unit to be controlled within the range of ±0.5 mm, such that dispensing with secondary process, the completion of the precise assembly and welding can be ensured for the cross beam unit and the side beam trough.

What is claimed is:

1. A full butt joint structure of a connection joint between a side frame and a cross beam of a bogie frame of a vehicle, with the side frame being parallel to travelling direction of the vehicle and the cross beam being perpendicular to travelling direction of the vehicle, wherein: the side frame is connected to the cross beam by a connecting seat to realize the full butt joint, wherein a side frame connecting end of the connecting seat, a transport column and a side frame inside vertical plate form a plate-plate butt joint structure, wherein the connecting seat comprises extending plates which respectively extend to two sides as the side frame connecting end, the transport column comprises a cylinder and two tabular bodies that respectively extend from the cylinder to two sides, the plate-plate butt joint structure is formed by assembling and welding one extending plate of the connecting seat on one side to one tabular body of the transport column, and assembling and welding one extending plate of another connecting seat to the other tabular body of the transport column, and then assembling and welding the other extending plate of each connecting seat on the other side to the side frame inside vertical plate; and the connecting seat further comprises a tube portion as a cross beam connecting end, and the cross beam connecting end of the connecting seat and the cross beam form a tube-tube butt joint structure.

2. An assembly welding process for a full butt joint structure of a connection joint between a side frame and a cross beam of a bogie frame of a vehicle, with the side frame being parallel to travelling direction of the vehicle and the cross beam being perpendicular to travelling direction of the vehicle, wherein: the side frame is connected to the cross beam by a connecting seat to realize the full butt joint, a side frame connecting end of the connecting seat and a transport column and a side frame inside vertical plate form a plate-plate butt joint structure, wherein the connecting seat comprises extending plates which respectively extend to two sides as the side frame connecting end, the transport column comprises a cylinder and two tabular bodies that respectively extend from the cylinder to two sides, the plate-plate butt joint structure is formed by assembling and welding one extending plate of the connecting seat on one side to one tabular body of the transport column, and assembling and welding one extending plate of another connecting seat to the other tabular body of the transport column, and then assembling and welding the other extending plate of each connecting seat on the other side to the side frame inside vertical plate; and the connecting seat further comprises a tube portion as a cross beam connecting end, and the cross beam connecting end of the connecting seat and the cross beam form a tube-tube butt joint structure, and the assembly welding process comprises assembling and welding the following components in sequence to form a bogie frame as a whole: the connecting seat and the cross beam; a cross beam unit; the connecting seat, the transport column and the side frame inside vertical plate; a side frame strengthen partition plate and an upper plate.

3. The method according to claim 2, wherein the welding for the connecting seat and the cross beam adopts a MAG automatic welding process, and the remaining welding adopts a MAG semi-automatic welding process.

4. The method according to claim 2, wherein a back gouging is performed when a double sides welding is adopted in the welding of the connecting seat and the cross beam, and a removable backing strip is adopted in the butt welding of the side frame connecting end of the connecting seat, the transport column and the side frame inside vertical plate.

5. The method according to claim 2, wherein a back gouging is performed when a double sides welding is adopted in the welding of the connecting seat and the cross beam tube, and a removable backing strip is adopted in the butt welding of the side frame connecting end of the connecting seat, the transport column and the side frame inside vertical plate.

* * * * *